United States Patent
Ferris et al.

(10) Patent No.: US 9,100,311 B2
(45) Date of Patent: *Aug. 4, 2015

(54) METERING SOFTWARE INFRASTRUCTURE IN A CLOUD COMPUTING ENVIRONMENT

(71) Applicant: Red Hat, Inc., Raleigh, NC (US)

(72) Inventors: James Michael Ferris, Cary, NC (US); Gerry Edward Riveros, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,153

(22) Filed: Jun. 2, 2014

(65) Prior Publication Data

US 2014/0280927 A1 Sep. 18, 2014

Related U.S. Application Data

(63) Continuation of application No. 12/551,514, filed on Aug. 31, 2009, now Pat. No. 8,769,083.

(51) Int. Cl.
*G06F 15/173* (2006.01)
*H04L 12/26* (2006.01)
*G06F 11/34* (2006.01)
*H04L 12/14* (2006.01)
(Continued)

(52) U.S. Cl.
CPC ........ *H04L 43/0876* (2013.01); *G06F 11/3409* (2013.01); *G06F 11/3419* (2013.01); *G06F 11/3466* (2013.01); *G06F 11/3495* (2013.01); *H04L 12/14* (2013.01); *H04L 12/1403* (2013.01); *H04L 12/1485* (2013.01); *H04L 29/06* (2013.01); *H04L 29/06027* (2013.01); *H04L 29/08072* (2013.01); *H04L 29/08144* (2013.01); *H04L 43/00* (2013.01); *H04L 65/4084* (2013.01); *H04L 65/4092* (2013.01); *G06F 2201/815* (2013.01); *G06F 2201/87* (2013.01); *G06F 2201/875* (2013.01); *H04L 12/1432* (2013.01); *H04L 65/607* (2013.01); *H04L 67/04* (2013.01); *H04L 67/306* (2013.01); *H04L 67/327* (2013.01); *H04L 69/14* (2013.01); *H04M 11/00* (2013.01); *H04W 4/02* (2013.01)

(58) Field of Classification Search
USPC .................... 709/226, 224; 707/803; 717/127
See application file for complete search history.

(56) References Cited

U.S. PATENT DOCUMENTS 6,463,457 B1   10/2002  Armentrout et al.
7,188,170 B1 *  3/2007  Burnley et al. ............... 709/224

(Continued)

OTHER PUBLICATIONS

Morgan, "Systems and Methods for Generating Optimized Resource Consumption Periods for Multiple Users on Combined Basis", U.S. Appl. No. 13/037,359, filed Mar. 1, 2011.

(Continued)

*Primary Examiner* — Kyung H Shin
(74) *Attorney, Agent, or Firm* — Lowenstein Sandler LLP

(57) ABSTRACT

A system and method include determining, by a processing device, a first duration of usage of a hardware resource on which a virtual machine is instantiated in a cloud, determining, by the processing device from the virtual machine on the cloud, a second duration of usage of a software resource that is utilized by a user on the virtual machine, the software resource comprising at least part of an operating system, and calculating, by the processing device, a usage of the cloud by the user in view of the first duration and the second duration.

20 Claims, 6 Drawing Sheets

(51) Int. Cl.
  *H04L 29/06* (2006.01)
  *H04L 29/08* (2006.01)
  *H04M 11/00* (2006.01)
  *H04W 4/02* (2009.01)

(56) References Cited

U.S. PATENT DOCUMENTS

| | | |
|---|---|---|
| 7,313,796 B2 | 12/2007 | Hamilton et al. |
| 7,439,937 B2 | 10/2008 | Ben-Shachar et al. |
| 7,529,785 B1 | 5/2009 | Spertus et al. |
| 7,546,462 B2 | 6/2009 | Upton |
| 7,596,620 B1 | 9/2009 | Colton et al. |
| 2001/0039497 A1 | 11/2001 | Hubbard |
| 2002/0069276 A1 | 6/2002 | Hino et al. |
| 2002/0165819 A1 | 11/2002 | McKnight et al. |
| 2003/0037258 A1 | 2/2003 | Koren |
| 2003/0110252 A1 | 6/2003 | Yang-Huffman |
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0215796 A1 | 9/2008 | Lam et al. |
| 2008/0240150 A1 | 10/2008 | Dias et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0254465 A1 | 10/2009 | Oester |
| 2009/0260007 A1 | 10/2009 | Beaty et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris |
| 2009/0300635 A1 | 12/2009 | Ferris |
| 2009/0300641 A1 | 12/2009 | Friedman et al. |
| 2009/0300719 A1 | 12/2009 | Ferris |
| 2010/0042720 A1* | 2/2010 | Stienhans et al. ............. 709/226 |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0218170 A1* | 8/2010 | MacLellan et al. ........... 717/127 |
| 2010/0220622 A1 | 9/2010 | Wei |
| 2010/0299366 A1* | 11/2010 | Stienhans et al. ............. 707/803 |
| 2011/0016214 A1 | 1/2011 | Jackson |
| 2011/0131335 A1 | 6/2011 | Spaltro et al. |

OTHER PUBLICATIONS

Morgan, "Systems and Methods for Metering Cloud Resource Consumption Using Multiple Hierarchical Subscription Periods", U.S. Appl. No. 13/037,360, filed Mar. 1, 2011.

Morgan, "Systems and Methods for Generating Marketplace Brokerage Exchange of Excess Subscribed Resources Using Dynamic Subscription Periods", U.S. Appl. No. 13/037,351, filed Feb. 28, 2011.

Morgan, "Systems and Methods for Detecting Resource Consumption Events Over Sliding intervals in Cloud-Based Network", U.S. Appl. No. 13/149,235, filed May 31, 2011.

Morgan, "Systems and Methods for Triggering Workload Movement Based on Policy Stack Having Multiple Selectable Inputs", U.S. Appl. No. 13/149,418, filed May 31, 2011.

Morgan, "Systems and Methods for Cloud Deployment Engine for Selective Workload Migration or Federation Based on Workload Conditions", U.S. Appl. No. 13/117,937, filed May 27, 2011.

Morgan, "Systems and Methods for Tacking Cloud Installation Information Using Cloud-Aware Kernel of Operating System", U.S. Appl. No. 13/149,750, filed May 31, 2011.

Morgan, *Systems and Methods for Introspective Application Reporting to Facilitate Virtual Machine Movement Between Cloud Hosts, U.S. Appl. No. 13/118,009, filed May 27, 2011.

Morgan, "Systems and Methods for Self-Moving Operating System Installation in Cloud-Based Network", U.S. Appl. No. 13/149,877, filed May 31, 2011.

Ferris, et al., "Systems and Methods for Cominatorial Optimization of Multiple Resources Across a Set of Cloud-Based Networks", U.S. Appl. No. 12/953,718, filed Nov. 24, 2010.

Ferris et al., "Systems and Methods for Matching a Usage History to a New Cloud", U.S. Appl. No. 12/953,757, filed Nov. 24, 2010.

Ferris at al., "Systems and Methods for Identifying Usage Histories for Producing Optimized Cloud Utilization", U.S. Appl. No. 12/952,930, filed Nov. 23, 2010.

Ferris et al., "Systems and Methods for Identifying Service Dependencies in a Cloud Deployment", U.S. Appl. No. 12/952,857, filed Nov. 23, 2010.

Ferris et al., "Systems and Methods for Migrating Subscribed Services in a Cloud Deployment", U.S. Appl. No. 12/955,277, filed Nov. 29, 2010.

Ferris et al., "Systems and Methods for Migrating Subscribed Services from a Set of Clouds to a Second Set of Clouds", U.S. Appl. No. 12/957,281, filed Nov. 30, 2010.

Morgan, "Systems and Methods for Generating Multi-Cloud Incremental Billing Capture and Administration", U.S. Appl. No. 12/954,323, filed Nov. 24, 2010.

Morgan, "Systems and Methods for Aggregating Marginal Subscription Offsets in a Set of Multiple Host Clouds", U.S. Appl. No. 12/954,400, filed Nov. 24, 2010.

(56) References Cited

OTHER PUBLICATIONS

Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable or Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., Systems and Methods for Reclassifying Virtual Machines to Target Virtual Machines or Appliances Based on Code Analysis in a Cloud Environment, U.S. Appl. No. 12/957,267, filed Nov. 30, 2010.
"rBuilder and the rPath Appliance Platform", 2007 rPath, Inc., www.rpath.com, 3 pages.
White Paper—"rPath Versus Other Software Appliance Approaches", Mar. 2008, rPath, Inc., www.rpath.com, 9 pages.
White Paper—"Best Practices for Building Virtual Appliances", 2008 rPath, Inc., www.rpath.com, 6 pages.
DeHaan et al., "Methods and Systems for Flexible Cloud Management with Power Management Support", U.S. Appl. No. 12/473,987, filed May 28, 2009.
Ferris, "Methods and Systems for Providing a Market for User-Controlled Resources to be Provided to a Cloud Computing Environment", U.S. Appl. No. 12/390,617, filed Feb. 23, 2009.
Ferris, "Methods and Systems for Communicating with Third Party Resources in a Cloud Computing Environment", U.S. Appl. No. 12/390,598, filed Feb. 23, 2009.
Ferris, "Systems and Methods for Extending Security Platforms to Cloud-Based Networks", U.S. Appl. No. 12/391,802, filed Feb. 24, 2009.
DeHaan et al., "Methods and Systems for Flexible Cloud Management", U.S. Appl. No. 12/473,041, filed May 27, 2009.
DeHaan et al., "Systems and Methods for Power Management in Managed Network Having Hardware-Based and Virtual Reources", U.S. Appl. No. 12/475,448, filed May 29, 2009.
Ferris, "Methods and Systems for Providing a Universal Marketplace for Resources for Delivery to a Cloud Computing Environment", U.S. Appl. No. 12/475,228, filed May 29, 2009.
DeHaan, "Methods and Systems for Abstracting Cloud Management", U.S. Appl. No. 12/474,113, filed May 28, 2009.
DeHaan, "Methods and Systems for Automated Scaling of Cloud Computing Systems", U.S. Appl. No. 12/474,707, filed May 29, 2009.
DeHaan, "Methods and Systems for Securely Terminating Processes in a Cloud Computing Environment", U.S. Appl. No. 12/550,157, filed Aug. 23, 2009.
DeHaan et al., "Methods and Systems for Flexible Cloud Management Including External Clouds", U.S. Appl. No. 12/551,506, filed Aug. 31, 2009.
DeHaan, "Methods and Systems for Abstracting Cloud Management to Allow Communication Between Independently Controlled Clouds", U.S. Appl. No. 12/551,096, filed Aug. 31, 2009.
DeHaan, "Methods and Systems for Automated Migration of Cloud Processes to External Clouds", U.S. Appl. No. 12/551,459, filed Aug. 31, 2009.
Ferris et al., "Methods and Systems for Pricing Software Infrastructure for a Cloud Computing Environment", U.S. Appl. No. 12/551,517, filed Aug. 31, 2009.
DeHaan et al., "Systems and Methods for Secure Distributed Storage", U.S. Appl. No. 12/610,081, filed Oct. 30, 2009.
Ferris et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris at al., "Methods and Systems for Generating a Software License Knowledge Base for Verifying Software License Compliance in Cloud Computing Environments", U.S. Appl. No. 12/628,156, filed Nov. 30, 2009.
Ferris et al., "Methods and Systems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via a Resource Specification Language Wrapper", U.S. Appl. No. 12/790,294, filed May 28, 2010.
Ferris et al., "Systems and Methods for Managing Multi-Level Service Level Agreements in Cloud-Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance" U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris at al., "Systems and Methods for Aggregate Monitoring of Utilization Data for Vendor Products in Cloud Networks", U.S. Appl. No. 12/790,039, filed May 28, 2010.

* cited by examiner

| PROCESS ID | OPERATING SYSTEM | SOFTWARE UTILIZED | DURATION (HOURS) |
|---|---|---|---|
| VIRTUAL MACHINE 0001 | LINUX (HOST AND GUEST) | LINUX | 200.5 |
| | | APP. SERVER | 190.3 |
| | | HOSTING SERVER | 195.7 |
| SOFTWARE APPLIANCE 0001 | LINUX | LINUX | 150.0 |
| | | EMAIL SERVER | 150.0 |
| SOFTWARE INSTANCE | LINUX | LINUX | 10.4 |
| | | FIREFOX | 10.4 |

FIG. 4

METERING SOFTWARE INFRASTRUCTURE IN A CLOUD COMPUTING ENVIRONMENT

CROSS REFERENCE TO RELATED APPLICATION

This application is a Continuation of U.S. patent application Ser. No. 12/551,514, the entire contents of which are hereby incorporated by reference herein.

FIELD

This invention relates generally to products and services, more particularly, to systems and methods for cloud computing related services and products.

DESCRIPTION OF THE RELATED ART

The advent of cloud-based computing architectures has opened new possibilities for the rapid and scalable deployment of virtual Web stores, media outlets, and other on-line sites or services. In general, a cloud-based architecture deploys a set of hosted resources such as processors, operating systems, software and other components that can be combined or strung together to form virtual machines. A user or customer can request the instantiation of a virtual machine or set of machines from those resources from a central server or management system to perform intended tasks or applications. For example, a user may wish to set up and instantiate a virtual server from the cloud to create a storefront to market products or services on a temporary basis, for instance, to sell tickets to an upcoming sports or musical performance. The user can lease or subscribe to the set of resources needed to build and run the set of instantiated virtual machines on a comparatively short-term basis, such as hours or days, for their intended application. Likewise, entities such as companies, corporations and universities can utilize clouds in order to pool their internal computing resources in order to perform various computing processes.

Typically, when determining the usage of a cloud, the hardware usage of a particular virtual machine is measured. For example, when determining the cost for leasing cloud resources, a vendor of the cloud will measure the hardware resources, i.e. processor cycles, amount of memory, etc., used by a particular customer.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 4 illustrates an exemplary record for storing the utilization of the software infrastructure;

DETAILED DESCRIPTION OF EMBODIMENTS

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for metering infrastructure utilization in a cloud computing environment. More particularly, embodiments relate to platforms and techniques in which a cloud management system can meter both hardware and software infrastructure utilization in a cloud computing environment.

According to embodiments, a cloud management system can be configured to include a metering tool for metering infrastructure utilization in a cloud. The metering tool can be configured to monitor the software resources of the cloud to meter the software utilization of the cloud. In particular, the metering tool can be configured to cooperate and communicate with the cloud management system to determine the software resources utilized by processes instantiated in the cloud and to track the duration of the utilization. The metering tool can be configured to store the tracked utilization in a record.

By tracking the utilization of the software infrastructure, the cloud management system can accurately and reliably monitor the demands placed on the software infrastructure of the cloud. As such, an operator can enhance the flexibility, power, and reliability of the cloud environment. Additionally, by tracking the utilization of the software infrastructure, the operator can price access to the cloud based on the utilization of the software resources.

Figure 1:
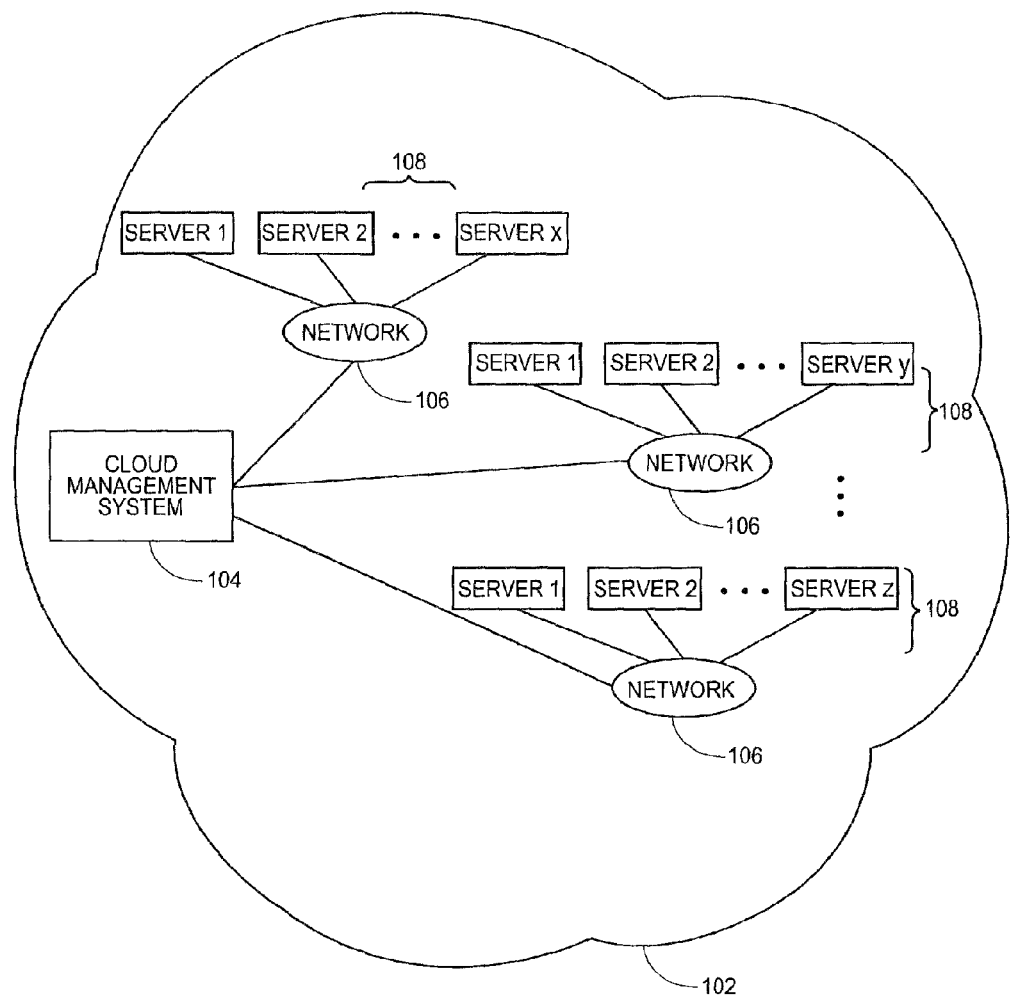
FIG. 1 illustrates an overall cloud system architecture in which various embodiments of the present teachings can be practiced.

FIG. 1 illustrates an overall cloud computing environment, in which systems and methods for the management of subscriptions of cloud-based virtual machines can operate, according to embodiments of the present teachings. Embodiments described herein can be implemented in or supported by a cloud network architecture. As used herein, a "cloud" can comprise a collection of resources that can be invoked to instantiate a virtual machine, process, or other resource for a limited or defined duration. As shown for example in FIG. 1, the collection of resources supporting a cloud 102 can comprise a set of resource servers 108 configured to deliver computing components needed to instantiate a virtual machine, process, or other resource. For example, one group of resource servers can host and serve an operating system or components thereof to deliver to and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software. Other types of resource servers are possible.

In embodiments, the entire set of resource servers 108 or other hardware or software resources used to support the cloud 102 along with its instantiated virtual machines can be managed by a cloud management system 104. The cloud management system 104 can comprise a dedicated or centralized server and/or other software, hardware, and network tools that communicate via one or more networks 106 such as the Internet or other public or private network with all sets of resource servers to manage the cloud 102 and its operation. To instantiate a new set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The request can be received and processed by the cloud management system 104, which identifies the type of virtual machine, process, or other resource being requested. The cloud management system 104 can then identify the collection of resources necessary to instantiate that machine or resource. In embodiments, the set of instantiated virtual machines or other resources can for example comprise virtual transaction servers used to support Web storefronts, or other transaction sites.

In embodiments, the user's instantiation request can specify a variety of parameters defining the operation of the set of virtual machines to be invoked. The instantiation request, for example, can specify a defined period of time for which the instantiated machine or process is needed. The period of time can be, for example, an hour, a day, or other increment of time. In embodiments, the user's instantiation request can specify the instantiation of a set of virtual machines or processes on a task basis, rather than for a predetermined amount of time. For instance, a user could request resources until a software update is completed. The user's instantiation request can specify other parameters that define the configuration and operation of the set of virtual machines or other instantiated resources. For example, the request can specify an amount of processing power or input/output (I/O) throughput the user wishes to be available to each instance of the virtual machine or other resource. In embodiments, the requesting user can for instance specify a service level agreement (SLA) acceptable for their application. Other parameters and settings can be used. One skilled in the art will realize that the user's request can likewise include combinations of the foregoing exemplary parameters, and others.

When the request to instantiate a set of virtual machines or other resources has been received and the necessary resources to build that machine or resource have been identified, the cloud management system 104 can communicate with one or more set of resource servers 108 to locate resources to supply the required components. The cloud management system 104 can select providers from the diverse set of resource servers 108 to assemble the various components needed to build the requested set of virtual machines or other resources. It may be noted that in some embodiments, permanent storage such as hard disk arrays may not be included or located within the set of resource servers 108 available to the cloud management system 104, because the set of instantiated virtual machines or other resources may be intended to operate on a purely transient or temporary basis. In embodiments, other hardware, software or other resources not strictly located or hosted in the cloud can be leveraged as needed. For example, other software services that are provided outside of the cloud 102 and hosted by third parties can be invoked by in-cloud virtual machines. For further example, other non-cloud hardware and/or storage services can be utilized as an extension to the cloud 102, either on an on-demand or subscribed or decided basis.

With the resource requirements identified, the cloud management system 104 can extract and build the set of virtual machines or other resources on a dynamic or on-demand basis. For example, one set of resource servers 108 can respond to an instantiation request for a given quantity of processor cycles with an offer to deliver that computational power immediately and guaranteed for the next hour. A further set of resource servers 108 can offer to immediately supply communication bandwidth, for example on a guaranteed minimum or best-efforts basis. In other embodiments, the set of virtual machines or other resources can be built on a batch basis or at a particular future time. For example, a set of resource servers 108 can respond to a request for instantiation at a programmed time with an offer to deliver the specified quantity of processor cycles within a specific amount of time, such as the next 12 hours.

The cloud management system 104 can select a group of servers in the set of resource servers 108 that match or best match the instantiation request for each component needed to build the virtual machine or other resource. The cloud management system 104 can then coordinate the integration of the completed group of servers from the set of resource servers 108, to build and launch the requested set of virtual machines or other resources. The cloud management system 104 can track the combined group of servers selected from the set of resource servers 108, or other distributed resources that are dynamically or temporarily combined, to produce and manage the requested virtual machine population or other resources.

In embodiments, the cloud management system 104 can generate a resource aggregation table that identifies the various sets of resource servers that will be used to supply the components of the virtual machine or process. The sets of resource servers can be identified by unique identifiers such as, for instance, Internet Protocol (IP) addresses or other addresses. The cloud management system 104 can register the finalized group of servers in the set resource servers 108 contributing to an instantiated machine or process.

The cloud management system 104 can then set up and launch the initiation process for the virtual machines, processes, or other resources to be delivered from the cloud. The cloud management system 104 can for instance transmit an instantiation command or instruction to the registered group of servers in set of resource servers 108. The cloud management system 104 can receive a confirmation message back from each participating server in a set of resource servers 108 indicating a status regarding the provisioning of their respective resources. Various sets of resource servers can confirm, for example, the availability of a dedicated amount of processor cycles, amounts of electronic memory, communications bandwidth, or applications or other software prepared to be served.

Figure 2:
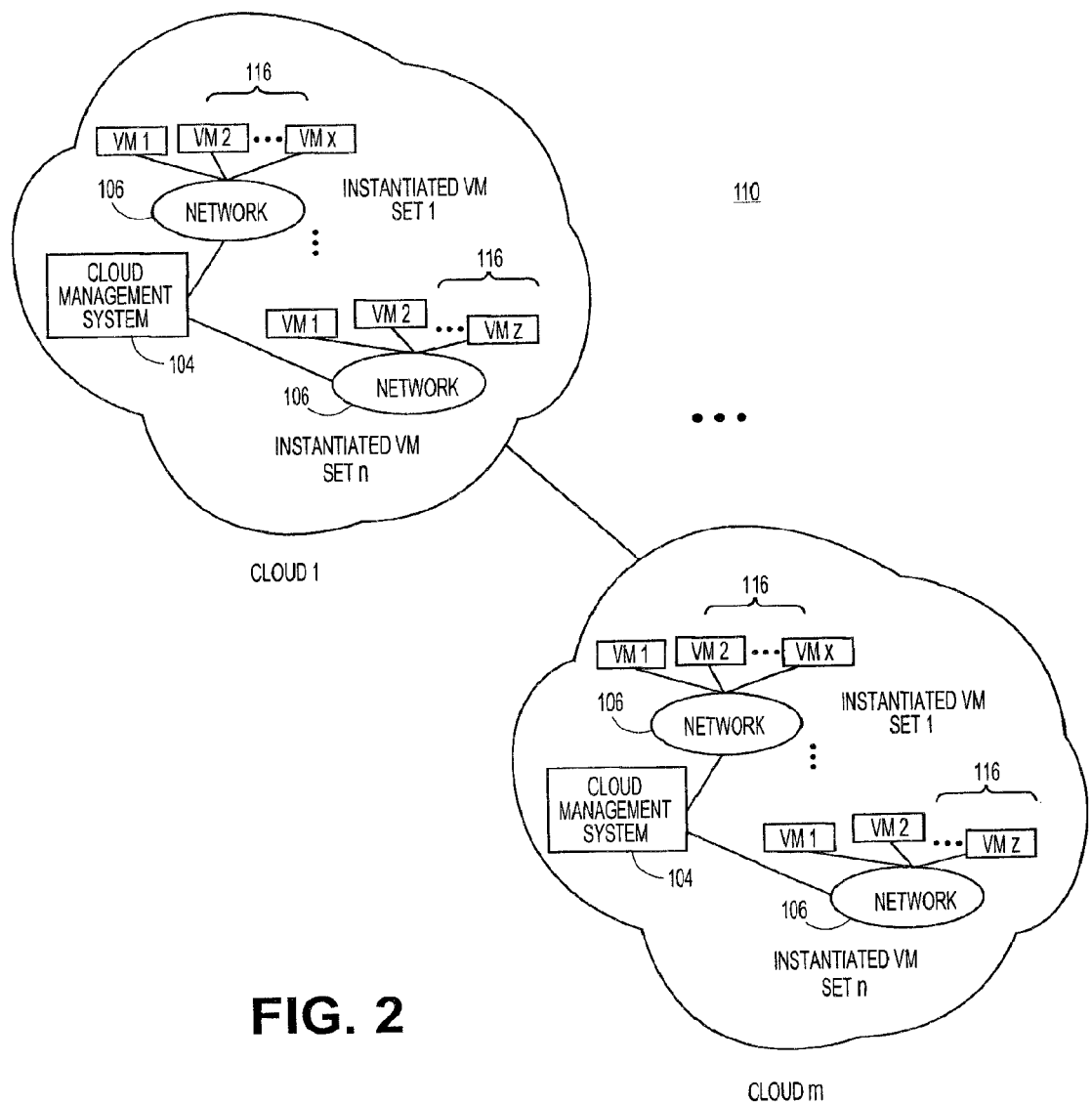
FIG. 2 illustrates an overall cloud system architecture in which various embodiments of the present teachings can be practiced in another regard including multiple cloud arrangements, according to various embodiments.

As shown for example in FIG. 2, the cloud management system 104 can then instantiate one or more than one set of virtual machines 116, or other processes based on the resources supplied by the registered set of resource servers 108. In embodiments, the cloud management system 104 can instantiate a given number, for example, 10, 500, 1000, or other number of virtual machines to be made available to users on a network 106, such as the Internet or other public or private network. Each virtual machine can be assigned an instantiated machine ID that can be stored in the resource aggregation table, or other record or image of the instantiated population. Additionally, the cloud management system 104 can store the duration of each virtual machine and the collection of resources utilized by the complete set of instantiated virtual machines 116.

In embodiments, the cloud management system 104 can further store, track and manage a user's identity and associated set of rights or entitlements to software, hardware, and other resources. Each user that populates a set of virtual machines in the cloud can have specific rights and resources assigned and made available to them. The cloud management system 104 can track and configure specific actions that a user can perform, such as provision a set of virtual machines with software applications or other resources, configure a set of virtual machines to desired specifications, submit jobs to the set of virtual machines or other host, manage other users of the set of instantiated virtual machines 116 or other resources, and other privileges or actions. The cloud management system 104 can further generate records of the usage of instantiated virtual machines to permit tracking, billing, and auditing of the services consumed by the user. In embodiments, the cloud management system 104 can for example meter the usage and/or duration of the set of instantiated virtual machines 116, to generate subscription billing records for a user that has launched those machines. Other billing or value arrangements are possible.

The cloud management system 104 can configure each virtual machine to be made available to users of the one or more networks 106 via a browser interface, or other interface or mechanism. Each instantiated virtual machine can communicate with the cloud management system 104 and the underlying registered set of resource servers 108 via a standard Web application programming interface (API), or via other calls or interfaces. The set of instantiated virtual machines 116 can likewise communicate with each other, as well as other sites, servers, locations, and resources available via the Internet or other public or private networks, whether within a given cloud 102 or between clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the cloud 102. In embodiments, the set of virtual machines 116 or other resources may not depend on or require the user's own on-premise hardware or other resources. In embodiments, a user can therefore request and instantiate a set of virtual machines or other resources on a purely off-premise basis, for instance to build and launch a virtual storefront or other application.

Because the cloud management system 104 in one regard specifies, builds, operates and manages the set of instantiated virtual machines 116 on a logical level, the user can request and receive different sets of virtual machines and other resources on a real-time or near real-time basis, without a need to specify or install any particular hardware. The user's set of instantiated virtual machines 116, processes, or other resources can be scaled up or down immediately or virtually immediately on an on-demand basis, if desired. In embodiments, the various sets of resource servers that are accessed by the cloud management system 104 to support a set of instantiated virtual machines 116 or processes can change or be substituted, over time. The type and operating characteristics of the set of instantiated virtual machines 116 can nevertheless remain constant or virtually constant, since instances are assembled from abstracted resources that can be selected and maintained from diverse sources based on uniform specifications.

In terms of network management of the set of instantiated virtual machines 116 that have been successfully configured and instantiated, the cloud management system 104 can perform various network management tasks including security, maintenance, and metering for billing or subscription purposes. The cloud management system 104 of a given cloud 102 can, for example, install or terminate applications or appliances on individual machines. The cloud management system 104 can monitor operating virtual machines to detect any virus or other rogue process on individual machines, and for instance terminate the infected application or virtual machine. The cloud management system 104 can likewise manage an entire set of instantiated virtual machines 116 or other resources on a collective basis, for instance, to push or deliver a software upgrade to all active virtual machines. Other management processes are possible.

In embodiments, more than one set of virtual machines can be instantiated in a given cloud at the same, overlapping or successive times. The cloud management system 104 can, in such implementations, build, launch and manage multiple sets of virtual machines based on the same or different underlying set of resource servers 108, with populations of different sets of instantiated virtual machines 116 such as may be requested by different users. The cloud management system 104 can institute and enforce security protocols in a cloud 102 hosting multiple sets of virtual machines. Each of the individual sets of virtual machines can be hosted in a respective partition or sub-cloud of the resources of the cloud 102. The cloud management system 104 of a cloud can for example deploy services specific to isolated or defined sub-clouds, or isolate individual workloads/processes within the cloud to a specific sub-cloud. The subdivision of the cloud 102 into distinct transient sub-clouds or other sub-components which have assured security and isolation features can assist in establishing a multiple user or multi-tenant cloud arrangement. In a multiple user scenario, each of the multiple users can use the cloud platform as a common utility while retaining the assurance that their information is secure from other users of the overall cloud system. In further embodiments, sub-clouds can nevertheless be configured to share resources, if desired.

In embodiments, and as also shown in FIG. 2, the set of instantiated virtual machines 116 generated in a first cloud 102 can also interact with a set of instantiated virtual machines or processes generated in a second, third or further cloud 102. The cloud management system 104 of a first cloud 102 can interface with the cloud management system 104 of a second cloud 102, to coordinate those domains and operate the clouds and/or virtual machines or processes on a combined basis. The cloud management system 104 of a given cloud 102 can track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, or other entity. In embodiments, the user can be or include another virtual machine, application or process. In further embodiments, multiple users or entities can share the use of a set of virtual machines or other resources.

Figure 3:
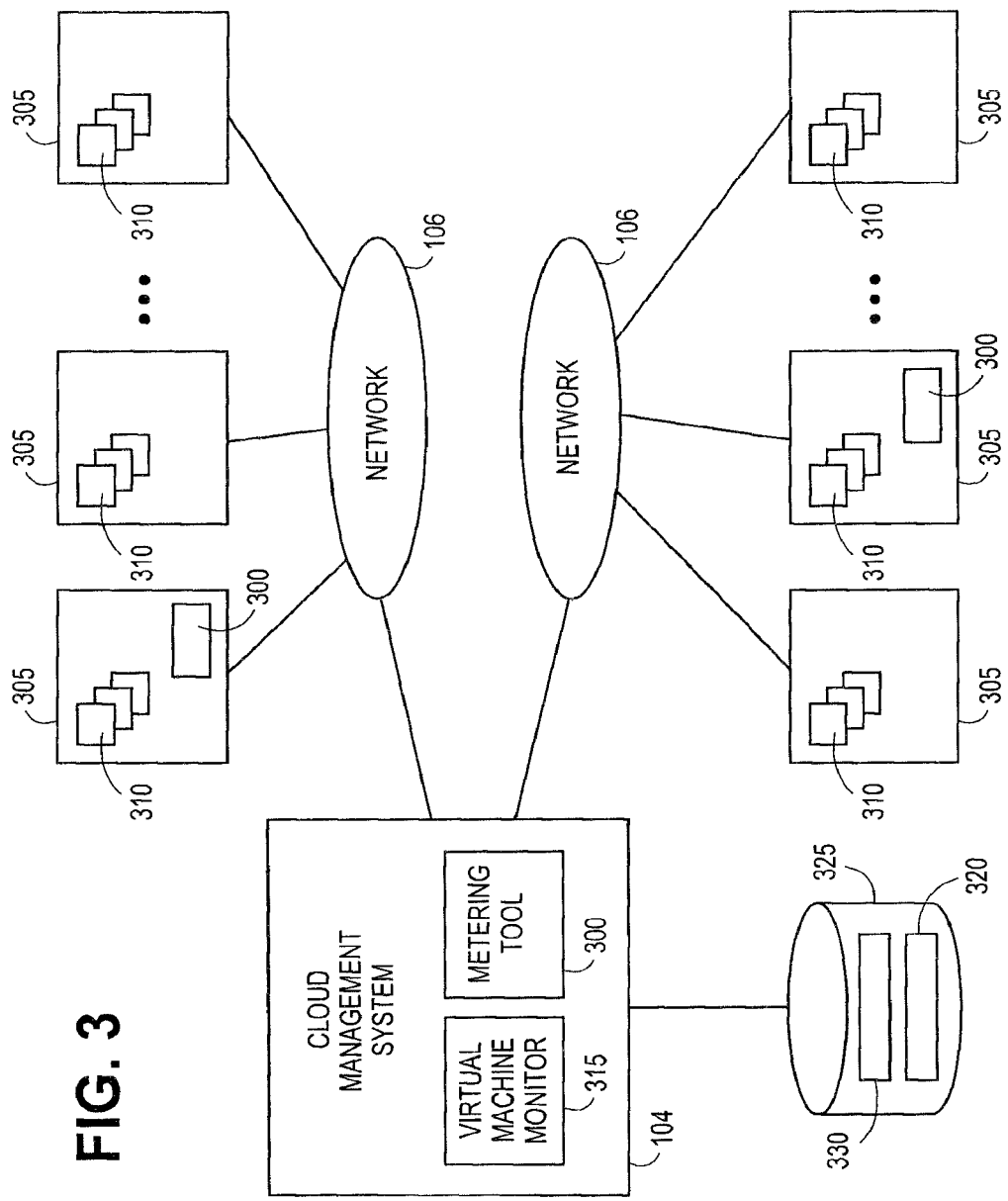
FIG. 3 illustrates an overall system in which a metering tool can track the utilization of software infrastructure of a cloud, according to various embodiments.

FIG. 3 illustrates aspects of the cloud 102 and the cloud management system 104 which can include one or more metering tools 300, according to various embodiments. In embodiments, the metering tools 300 can be configured to monitor the hardware and software resources of the cloud 102 in order to determine the utilization of the hardware and software resources by processes instantiated in the cloud 102. While FIG. 3 illustrates various components of the cloud 102, one skilled in the art will realize that components can be added or removed.

In embodiments, the cloud 102 can include one or more computing systems 305, such as the set of resource server 108 as described above, coupled to one or more networks 106. The computing systems 305 can be any type of computing systems to provide resources to the cloud 102, such as servers, laptops, desktops, and the like. The computing systems 305 can include a number of hardware resources that are used to support virtual machines, software appliances, processes and the like in the cloud 102, such as such as processors, memory, network hardware and bandwidth, storage devices, etc. Likewise, the computing system 305 can include software resources 310 that are used to support virtual machines, software appliances, processes and the like in the cloud 102. The software resources 310 can include operating systems, application programs, and the like.

In embodiments, the cloud 102 can be used for a variety of purposes. For example, the cloud 102 can be owned and/or operated by a cloud vendor, such as AMAZON, Inc., in order to provide the resources of the cloud 102 to subscribers and customers. Likewise, for example, the cloud 102 can be owned and/or operated by a entity (e.g. company, corporation, university etc.), and the resources of the cloud 102 can be used by the entity to support various computing processes.

In embodiments, the software resources 310, included in the computing systems 305, can depend on the particular usage of the cloud 102. For example, if the cloud 102 is operated by a cloud vendor, the software resources 310 can include operating systems, such as LINUX provided by Red Hat Corporation, and various application programs requested or typically desired by subscribers, such as middleware applications, web hosting applications, electronic mail (email) applications, and the like. Likewise, for example, if the cloud 102 is operated by an entity for internal use, the software resources 310 can include software resources 310 required to support the specific internal uses. For instance, the cloud 102 can be utilized by a corporation to perform simulations on a product and the software resources 310 can include operating systems and application programs to run the simulations.

In embodiments, as also described above, the cloud management system 104 can be configured to monitor, manage, and maintain the cloud 102. The cloud management system 104 can be configured to allocate the resources (hardware resources and software resources 310) of the computing systems 205 in order to allow the usage of the cloud 102. For example, the cloud management system 104 can be configured to include a virtual machine monitor 315. The virtual machine monitor 315 can be configured to allocate the resources of the computing systems 305, instantiate virtual machines on the computing systems 305, monitor the virtual machines during their instantiation, and terminate the virtual machines once use is finished. The virtual machine monitor 315 can be any type of conventional open-source or proprietary virtual machine monitor, such as Xen, that allows several guest operating systems to be run on the same hardware resources. Likewise, the cloud management system 104 can be configured to instantiate, monitor, and terminate other processes in the cloud 102, such as software appliances, individual applications, and other processes.

In embodiments, the cloud management system 104 can be configured to include the metering tool 300 in order to determine, track and record the utilization of the hardware resources and software resources 310 of the cloud 102. In particular, the metering tool 300 can be configured to determine the resources (hardware resources and software resources 310) that are utilized in the cloud 102, track the duration that the resources are utilized, and record the utilization for accounting or other purposes.

In embodiments, to determine and track the utilization, the metering tool 300 can be configured to cooperate with other components of the cloud management system 104, such as the virtual machine monitor 315, to determine the resources utilized in the cloud and track the utilization of the resources. Likewise, the metering tool 300 can be configured to directly query and monitor the computing systems 305 to determine and track the utilization of the resources of the cloud 102. For instance, the metering tool 300 can be configured to cooperate and communicate with operating systems running on the computing systems 305 in order to determine when resources of the computing systems 305 are utilized.

In embodiments, the metering tool 300 can be implemented as an application program that is configured to cooperate with the components of the cloud management system 104 and configured to directly query and monitor the computing system 305 in order to determine the resources that are utilized in the cloud 102. As such, the metering tool 300 can be configured to include the necessary logic, commands and instructions to communicate with the components of the cloud management system 104, such as the virtual machine monitor 315. Likewise, the metering tool 300 can be configured to include the necessary logic, commands and instructions to communicate with the hardware resources of the computing systems 305 and the software resources 310, such as the operating system and applications programs. The metering tool 300 can be implemented as a component of the cloud management system 104. Likewise, the metering tool 300 can be implemented as a standalone application program that can communicate with the cloud management system 104. In any implementation, the metering tool 300 can be written in any type of conventional programming language such as C, C++, JAVA, Perl, and the like.

In embodiments, one or more instances of the metering tool 305 can operate in the cloud 102. For instance, the cloud management system 104 can be configured to include (or communicate with, if separate) one instance of the metering tool 305 in order to coordinate and control the determination and tracking of the utilization of the resources of the cloud 102. Likewise, for example, one or more instances of the metering tool 300 can be located on the computing systems 305. When located on the computing systems 305, the metering tools 300 can be configured to query and monitor the computing system 305 to determine and track resource utilization and configured to report the resource utilization to the instance of the metering tool 300 located in (or communicating with) the cloud management system 104.

In embodiments, the metering tool 300 can be configured to determine and track the utilization of the hardware resource of the cloud 102. In particular, the metering tool 300 can be configured to actively monitor the hardware resources of the computing systems 305 and track the utilization of the hardware resources. For example, as virtual machines, software appliances, and other processes use the hardware resources of the computing systems 305, the metering tool 300 can monitor the hardware resources to determine the type (processors, memory, storage, network devices), the amount (number of processing cycles, amount of memory, amount of storage, amount of network bandwidth), and the duration (seconds, minutes, hours, days) the hardware resources are utilized.

In embodiments, the metering tool 300 can be configured to determine and track the utilization of the software resources 310 by processes instantiate in the cloud 102. In particular, the metering tool 300 can be configured to cooperate and communicate with the cloud management system 104 in order to determine the type of software resources 310 utilized, the number of instances of each type of software resources 310 utilized, and the duration each instance of software resources 310 is utilized. Likewise, the metering tool 300 can be configured to cooperate and communicate directly with the computing system 305 in order to determine the type of software resources 310 utilized and the duration each type of software resources 310 is utilized. For example, the metering tool 300 can be configured to determine the types and numbers of host and/or guest operating systems (LINUX, WINDOWS, etc) and applications programs (middleware applications, web hosting applications, email applications, etc.) that are utilized and the duration (seconds, minutes, hours, days) that each type is utilized.

In embodiments, for example, the metering tool 300 can be configured to determine and track the software resources 310 utilized in the virtual machines instantiated in the cloud 102. To achieve this, the metering tool 300 can be configured to communicate with the virtual machine monitor 315 to determine and track the software resources 310 utilized in the virtual machines. For instance, when a virtual machine is instantiated, the virtual machine monitor 315 can notify the metering tool 300 that a virtual machine has been instantiated. The notification can include an identification of the virtual machine, the type of the host operating system, and the type of the guest operating system created for the virtual machine. As software resources 310 are utilized in the virtual machine, the virtual machine monitor 315 can notify the metering tool 300 of the type of software resources 310, the start time of the software resources 310 utilization, and the end time of the software resources 310 utilization. As such, the metering tool 300 can track the duration that particular types of software resources 310 that are utilized by the virtual machines. Likewise, the virtual machine monitor 315 can notify the metering tool 300 of the start time and termination time of the virtual machine. As such, the metering tool 300 can determine and track the duration of the utilization of the guest operating system and the host operating system.

In embodiments, for example, the metering tool 300 can be configured to determine and track the software resources 310 utilized in other process instantiate in the cloud 102, such as software appliances and individual application programs. In particular, the metering tool 300 can be configured to communicate with the cloud management system 104 and monitor the computing systems 305 to determine and track the utilization of the software resources 310. For instance, when the cloud management system 104 instantiates a software appliance in the cloud 102, the cloud management system 104 can notify the metering tool 300 of the software resources 310 included in the appliance (e.g. operating system and application programs), the start time of the appliance, and the end time of the appliance. Likewise, for instance, the metering tool 300 can monitor the computing systems 305 for software appliances being started on the computing systems 305 and can track the duration that the software appliance runs on the computing systems 305. As such, the metering tool 300 can track the duration that the software resources 310 included in the software appliance are utilized.

Likewise, for instance, the metering tool 300 can determine and track when a particular software resource 310 is individually utilized on the computing systems 305. The metering tool 300 can be configured to communicate with operating systems running on the computing systems 305 in order to identify when the particular software resource 310 is utilized and the duration the software resource 310 is utilized.

In embodiments, as the metering tool 300 determines and tracks resource utilization, the metering tool 300 can be configured to store the utilization of the software resources 310 in a software record 320 and configured to store the utilization of the hardware resources in the hardware record 330. The record 320 can be configured to store the type of the software resources 310 utilized and the duration the software resources 310 are utilized. The metering tool 300 can be configured to maintain the hardware record 330 and the software record 320 in computer readable storage devices or media 325 (CD, DVD, hard drive, portable storage memory, etc.) whether local to the cloud management system 104 or remotely located. The metering tool 300 can be configured to maintain the hardware record 330 and the software record 320, in the computer readable storage devices or media 325, in any type of format that is accessible by a computing system, such as a file, tree, database, or other format.

In embodiments, the software record 320 can be configured to store the utilization of the software resources 310 in any type of data structure that allows the type of a particular software resources 310 to be associated with the duration that particular resource is utilized. FIG. 4 illustrates an exemplary software record 320 that can store the utilization of the software. As illustrated in FIG. 4, the software record 320 can be configured a table 400 including a number of rows 405 and columns 410. Each of the rows 405 can store the utilization of software resources 310 by a particular process instantiate in the cloud (e.g. virtual machine, software appliance, etc.). Each of the columns 410 can identify the data relevant to each particular process stored in the rows 405 such as, an identification of the process, the type of software resources 310 utilized in the process and the duration of the utilization of the software resource.

In embodiments, the metering tool 300 can be configured to search the software record 320 and/or the hardware record 330 and configured to output the data contained in the software record 320 and/or the hardware record 330. For example, the metering tool 300 can receive a request for data contained in the software record 320 and/or the hardware record 330 from the cloud management system 104 or any user or entity associated with the cloud 102. To achieve this, the metering tool 300 can be configured to provide the an interface to receive requests for data and provide the requested data. The interface can be configured to receive the request and to provide the data from the software record 320 and/or the hardware record 330 utilizing any type of communications, such as email, web page, text message, and the like. As such, the metering tool 300 can contain the necessary logic, commands and instructions to generate graphical user interfaces (GUIs), e.g. dialog boxes and web pages, and/or contain the necessary logic, commands and instructions to utilize other programs or applications to communicate with the cloud management systems 104 or other entities. Likewise, the metering tool 300 can contain the necessary logic, commands and instructions to search the software record 320 and/or the hardware record 330 according to the requests and retrieve the data.

In embodiments, the data regarding the utilization of the software resources 310, contained in the software record 320, can be used for a variety of purposes. For example, the owner or operator of the cloud 102 can use the data to track the usage of the software resources 310, determine a charge for subscribers utilization of the cloud 102, determine a need for additional software resources 310, and the like.

Figure 5:
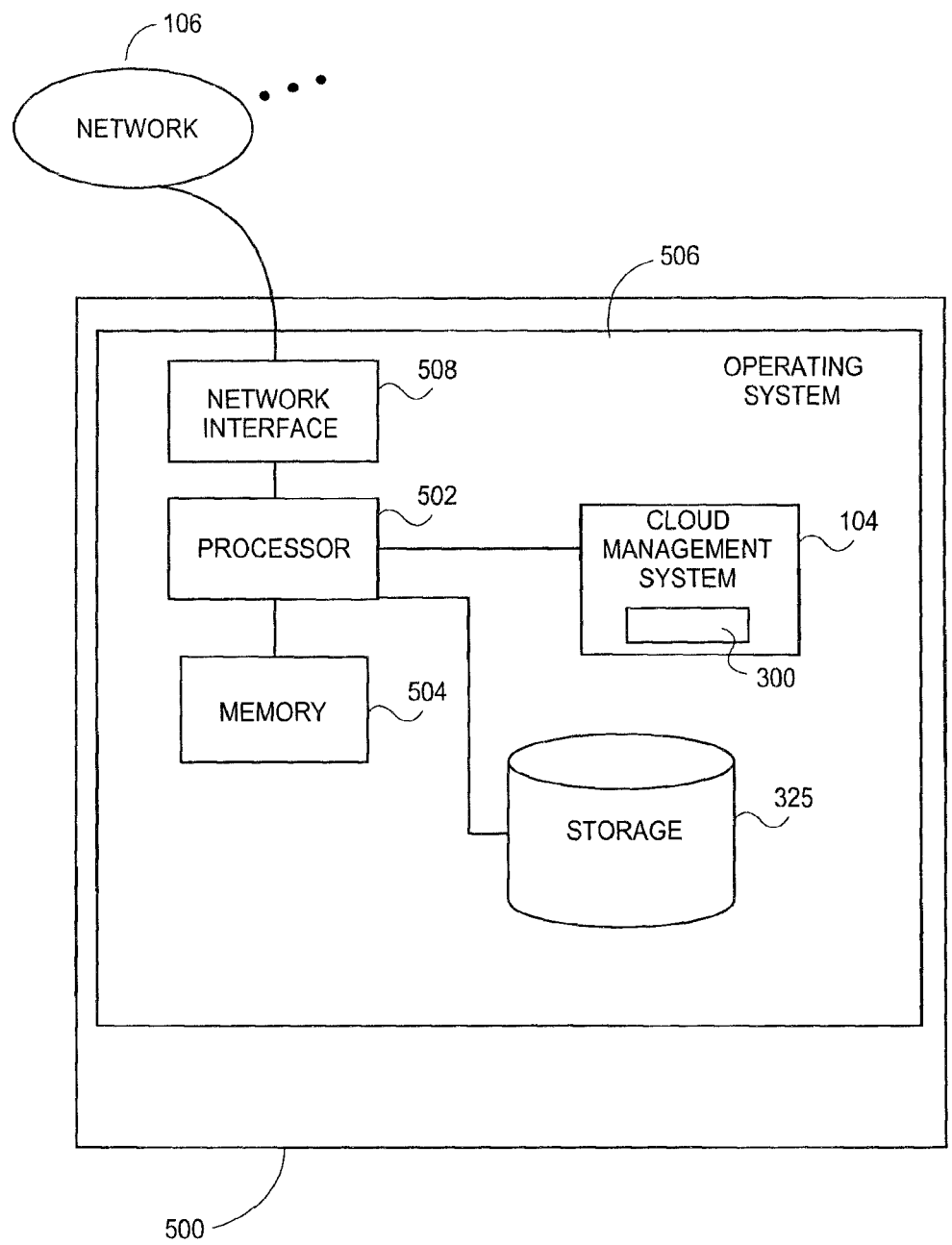
FIG. 5 illustrates an exemplary hardware configuration for a computing system implementing the cloud management system and metering tool, according to various embodiments.

FIG. 5 illustrates an exemplary diagram of hardware and other resources that can be incorporated in a computing system 500, which can implement the cloud management system 104, and configured to communicate with the clouds 102 via one or more networks 106, according to embodiments. In embodiments as shown, the computing system 500 can comprise a processor 502 communicating with memory 504, such as electronic random access memory, operating under control of or in conjunction with operating system 506. Operating system 506 can be, for example, a distribution of the Linux™ operating system, such as SELinux, the Unix™ operating system, or other open-source or proprietary operating system or platform. Processor 500 also communicates with one or more computer readable storage medium 325, such as hard drives, optical storage, and the like. Processor 500 further communicates with network interface 508, such as an Ethernet or wireless data connection, which in turn communicates with one or more networks 106, such as the Internet or other public or private networks.

Processor 500 also communicates with the cloud management system 104, which can include the metering tool 300, to execute control logic and allow for tracking resource utilization as described above and below. Other configurations of the computing system 500, associated network connections, and other hardware and software resources are possible.

While FIG. 5 illustrates the computing system 500 as a standalone system including a combination of hardware and software, the computing system 500 can include multiple systems operating in cooperation. The cloud management system 104, which can include the metering tool 300, can be implemented as a software application or program capable of being executed by the computing system 500, as illustrated, or other conventional computer platforms. Likewise, the metering tool 300, can also be implemented as a software module or program module capable of being incorporated in other software applications and programs. In either case, the cloud management system 104 and the metering tool 300 can be implemented in any type of conventional proprietary or open-source computer language. When implemented as a software application or program code, the cloud management system 104 and the metering tool 300 can be stored in a computer readable storage medium, such as storage 325 accessible by the computing system 500. Likewise, during execution, a copy of the cloud management system and the metering tool 300 can be stored in the memory 504.

Figure 6:
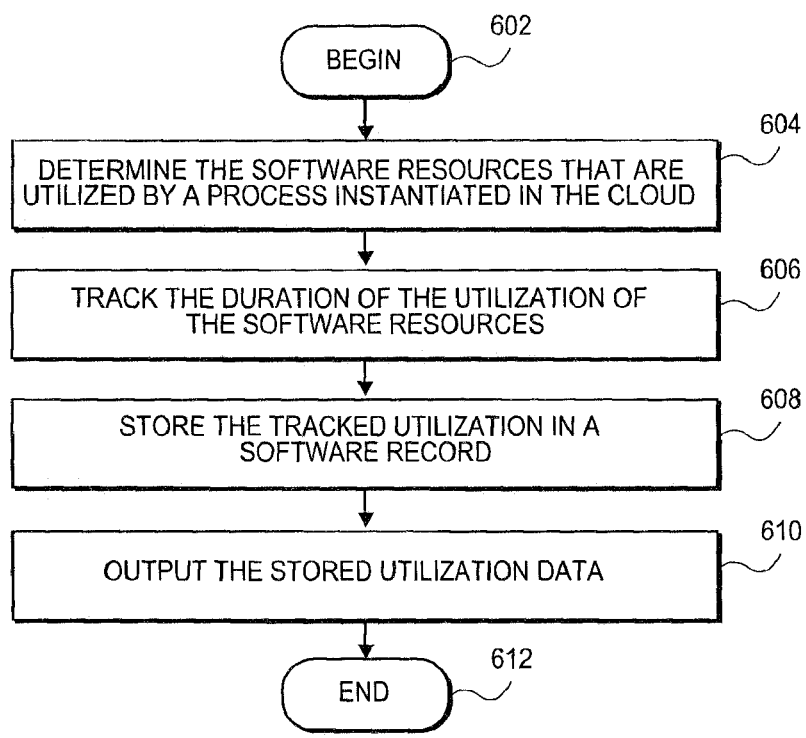
FIG. 6 illustrates a flowchart of an exemplary process for tracking the utilization of software infrastructure of a cloud, according to various embodiments.

FIG. 6 illustrates a flow diagram of an exemplary process for tracking the utilization of the software infrastructure of the cloud 102, according to embodiments. In 602, processing can begin. In 604, the metering tool 300 can determine the software resources that are utilized by a process instantiated in the cloud. The process can be any type of processes that can be supported by the cloud, such as a virtual machine, software appliance, and individual software instance.

To determine the software resources, for example, the metering tool 300 can communicate with the virtual machine monitor 315 to determine the software resources 310 utilized in the virtual machines. For instance, when a virtual machine is instantiated, the virtual machine monitor 315 can notify the metering tool 300 that a virtual machine has been instantiated. The notification can include an identification of the virtual machine, the type of the host operating system, and the type of the guest operating system created for the virtual machine. As software resources 310 are utilized in the virtual machine, the virtual machine monitor 315 can notify the metering tool 300 of the type of software resources 310 utilized.

Likewise, for example, the metering tool 300 can determine the software resources 310 utilized in other process instantiate in the cloud 102, such as software appliances and individual application programs. In particular, the metering tool 300 can communicate with the cloud management system 104 and monitor the computing systems 305 to determine the utilization of the software resources 310. For instance, when the cloud management system 104 instantiates a software appliance in the cloud 102, the cloud management system 104 can notify the metering tool 300 of the software resources 310 included in the appliance (e.g. operating system and application programs). Likewise, for instance, the metering tool 300 can monitor the computing systems 305 for software appliances being started on the computing systems 305. Additionally, for instance, the metering tool 300 can determine when a particular software resource 310 is individually utilized on the computing systems 305.

In 606, the metering tool 300 can track the duration of the utilization of the software resources 310. For example, when a virtual machine is instantiated, the virtual machine monitor 315 can notify the metering tool 300 of the start time and termination time of the virtual machine. Additionally, as software resources 310 are utilized in the virtual machine, the virtual machine monitor 315 can notify the metering tool 300 of the type of software resources 310, the start time of the software resources 310 utilization, and the end time of the software resources 310 utilization. As such, the metering tool 300 can track the duration that particular types of software resources 310 that are utilized by the virtual machines and track the duration of the utilization of the guest operating system and the host operating system.

Likewise, for example, the metering tool 300 can track the software resources 310 utilized in other process instantiate in the cloud 102, such as software appliances and individual application programs. For instance, when the cloud management system 104 instantiates a software appliance in the cloud 102, the cloud management system 104 can notify the start time of the appliance and the end time of the appliance. Likewise, the metering tool 300 can monitor the computing systems 305 can track the duration that the software appliance runs on the computing systems 305. As such, the metering tool 300 can track the duration that the software resources 310 included in the software appliance are utilized. Additionally, for example, the metering tool 300 can determine and track when a particular software resource 310 is individually utilized on the computing systems 305. The metering tool 300 can communicate with operating systems running on the computing systems 305 in order to identify when the particular software resource 310 is utilized and the duration the software resource 310 is utilized.

In 608, the metering tool 300 can store the tracked utilization in a software record 320. The software record 320 can store the utilization of the software resources 310 in any type of data structure that allows the type of a particular software resources 310 to be associated with the duration that particular resource is utilized. The metering tool 300 can maintain the hardware record 330 and the software record 320 in computer readable storage devices or media 325 (CD, DVD, hard drive, portable storage memory, etc.) whether local to the cloud management system 104 or remotely located.

In 610, the metering tool 300 can output the stored utilization data. For example, the metering tool 300 can receive a request for data contained in the software record 320 from the cloud management system 104 or any user or entity associated with the cloud 102. The metering tool 300 can provide an interface to receive requests for data and provide the requested data. The interface can be configured to receive the request and to provide the data from the software record 320 utilizing any type of communications, such as email, web page, text message, and the like. The metering tool 300 can search the software record 320 according to the requests and retrieve the data.

In 612, the process can end, but the process can return to any point and repeat.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A method comprising:
   determining, by a processing device, a first duration of usage of a hardware resource on which a virtual machine is instantiated in a cloud;
   determining, by the processing device from the virtual machine on the cloud, a second duration of usage of a software resource that is utilized by a user on the virtual machine, the software resource comprising at least part of an operating system; and
   calculating, by the processing device, a usage of the cloud by the user in view of the first duration and the second duration.

2. The method of claim 1, wherein the hardware resource comprises at least one or more of a processor, a memory, a network hardware, or a bandwidth.

3. The method of claim 1, wherein determining the first duration comprises:
   receiving a start time and a termination time of the virtual machine; and
   calculating the first duration from the start time and the termination time of the virtual machine.

4. The method of claim 1, wherein determining the second duration comprises:
   receiving a start time and a termination time of the software resource; and
   calculating the second duration from the start time and the termination time of the software resource.

5. The method of claim 1, wherein determining the second duration comprises:
   monitoring at least one computing system supporting the virtual machine for a start time and a termination time of the software resource; and
   calculating the second duration from the start time and the termination time of the software resource.

6. The method of claim 1, wherein the software resource further comprises an application software.

7. The method of claim 1, further comprising:
   recording the first duration on a first record of the usage of the hardware resource;
   receiving an identifier of the software resource from a cloud management system of the cloud; and
   recording the second duration on a second record of the usage of the software resource.

8. A non-transitory computer readable storage medium comprising instructions that, when executed by a processing device, cause the processing device to:
   determine a first duration of usage of a hardware resource on which a virtual machine is instantiated in a cloud;
   determine, from the virtual machine on the cloud, a second duration of usage of a software resource that is utilized by a user on the virtual machine, the software resource comprising at least part of an operating system; and
   calculate a usage of the cloud by the user in view of the first duration and the second duration.

9. The non-transitory computer readable storage medium of claim 8, wherein the hardware resource comprises at least one or more of a processor, a memory, a network hardware, or a bandwidth.

10. The non-transitory computer readable storage medium of claim 8, wherein to determine the first duration, the processing device is further to:
    receive a start time and a termination time of the virtual machine; and
    calculate the first duration from the start time and the termination time of the virtual machine.

11. The non-transitory computer readable storage medium of claim 8, wherein to determine the second duration, the processing device is further to:
    receive a start time and a termination time of the software resource; and
    calculate the second duration from the start time and the termination time of the software resource.

12. The non-transitory computer readable storage medium of claim 8, wherein to determine the second duration, the processing device is further to:

monitor at least one computing system supporting the virtual machine for a start time and a termination time of the software resource; and calculate the second duration from the start time and the termination time of the software resource.

13. The non-transitory computer readable storage medium of claim 8, wherein the software resource further comprises an application software.

14. The non-transitory computer readable storage medium of claim 8, wherein the processing device is further to:

record the first duration on a first record of the usage of the hardware resource;

receive an identifier of each particular software resource from a cloud management system of the cloud; and record the second duration on a second record of the usage the software resource.

15. A system, comprising:

a memory;

a processing device, operatively, coupled to the memory, the processing device to:

determine a first duration of usage of a hardware resource on which a virtual machine is instantiated in a cloud;

determine, from the virtual machine on the cloud, a second duration of usage of a software resource that is utilized by a user on the virtual machine, the software resources comprising at least part of an operating system; and calculate a usage of the cloud by the user in view of the first duration and the second duration.

16. The system of claim 15, wherein the hardware resource comprises at least one or more of a processor, a memory, a network hardware, or a bandwidth.

17. The system of claim 15, wherein to determine the first duration, the processing device is further to:

receive a start time and a termination time of the virtual machine; and calculate the first duration from the start time and the termination time of the virtual machine.

18. The system of claim 15, wherein to determine the second duration, the processing device is further to:

receive a start time and a termination time of the software resource; and calculate the second duration from the start time and the termination time of the software resource.

19. The system of claim 15, wherein to determine the second duration, the processing device is further to:

monitor at least one computing system supporting the virtual machine for a start time and a termination time of the software resource; and calculate the second duration from the start time and the termination time of the software resource.

20. The system of claim 15, wherein the software resource further comprises an application software.

* * * * *